March 31, 1936. R. B. CALCUTT 2,035,862
WEATHER STRIP
Filed Nov. 19, 1934 3 Sheets-Sheet 1
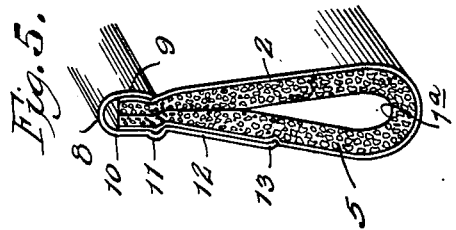
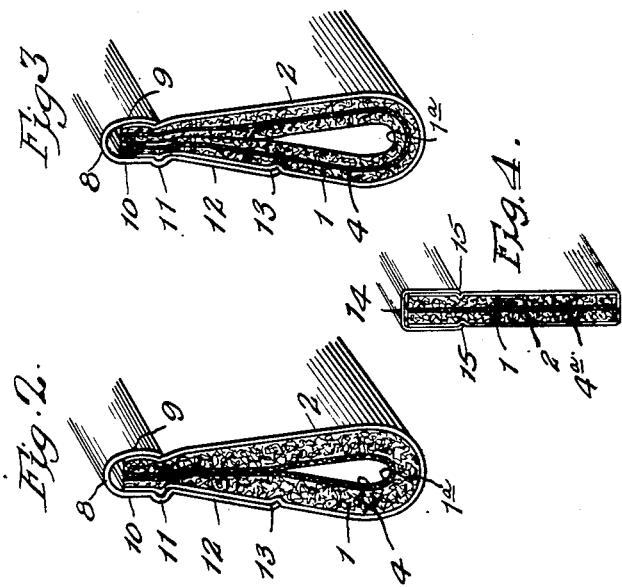
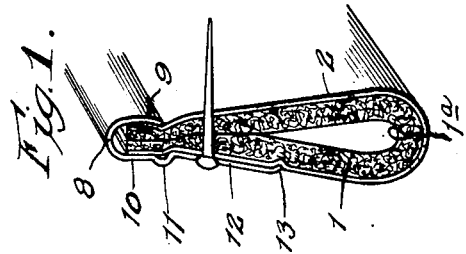
Inventor:
REGINALD B. CALCUTT.
By March 31, 1936.  R. B. CALCUTT  2,035,862
WEATHER STRIP
Filed Nov. 19, 1934  3 Sheets-Sheet 2

Inventor:
REGINALD B. CALCUTT
By E. K. Lundy  Atty.

March 31, 1936.
R. B. CALCUTT
2,035,862
WEATHER STRIP
Filed Nov. 19, 1934
3 Sheets-Sheet 3
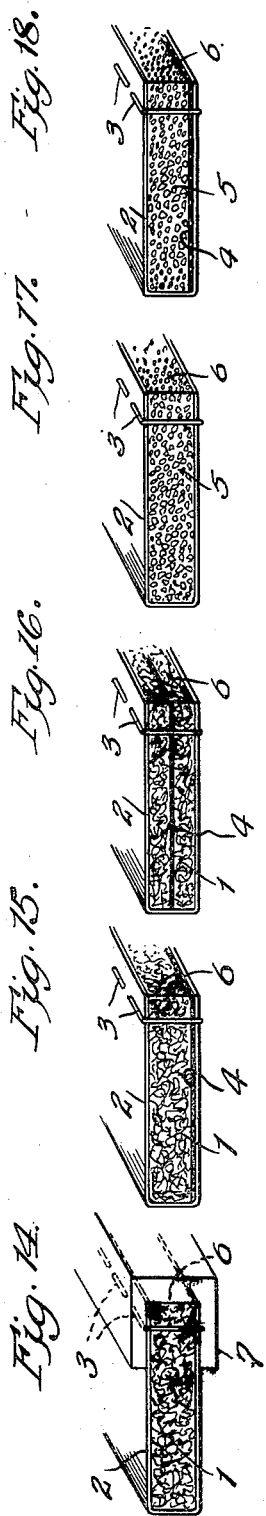
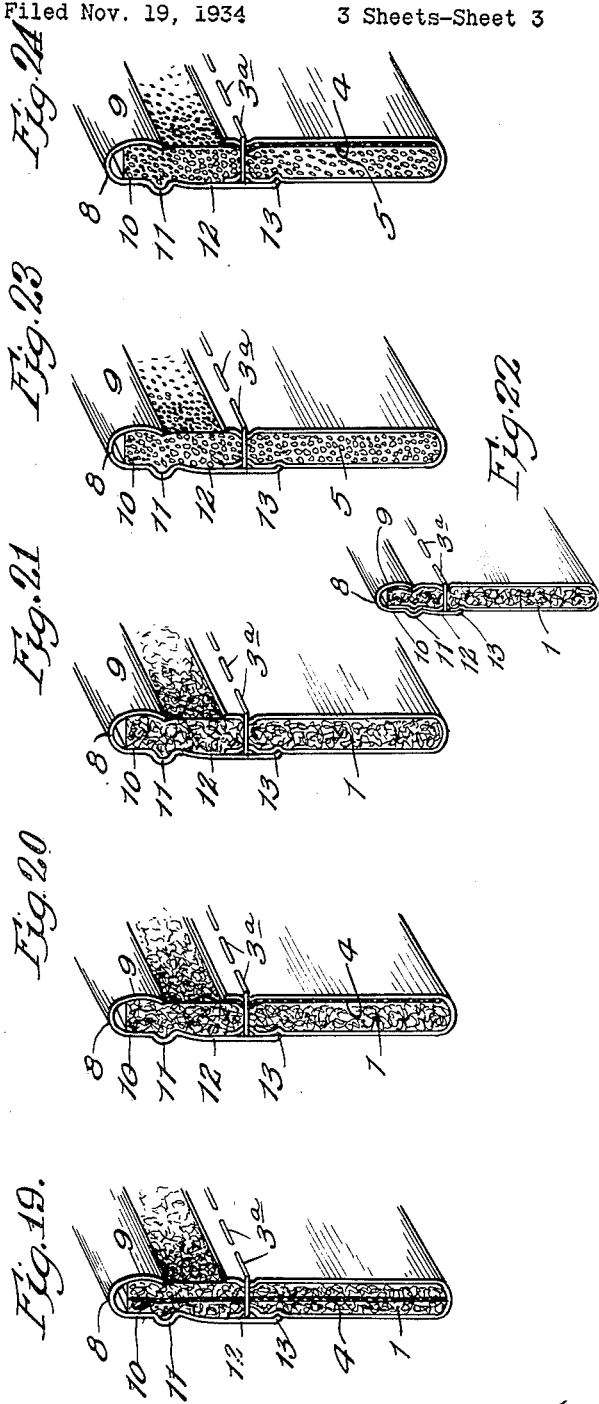
Inventor:
REGINALD B. CALCUTT
By E. N. Lundy Atty Patented Mar. 31, 1936

2,035,862

UNITED STATES PATENT OFFICE 2,035,862

WEATHER STRIP

Reginald B. Calcutt, Chicago, Ill.

Application November 19, 1934, Serial No. 753,616

21 Claims. (Cl. 20—69)

My present invention relates to weather-strips, gaskets and similar devices, and said device has been especially designed for use on windows, doors, ventilators, etc. where the stationary frames and the movable members are formed from metal. This weather-strip or gasket is particularly shaped for use in railway cars, street cars and similar structures. It will be understood, however, that the article may be used on windows and doors of houses, or the doors of refrigerators, and other locations where its use may be found desirable.

One of the distinctive features of the present invention is the provision of a water-proof covering on a strip of flexible, pliable material, (such as felt, sponge rubber or the like) which covering protects a plurality of the surfaces of said strip, leaving one of the longitudinal edges of the felt or rubber uncovered, the uncovered edge being the edge that is usually disposed in a groove or channel when in use. The covered strip of flexible, pliable, cushion material may be inserted either in a groove that is formed in the window or door member or wood molding strip, or the same may be clamped in a suitably shaped retainer strip or casing made from thin yieldable metal.

Also it will be noted that the covering material may be either stitched to the flexible, pliable, cushion material or it may be maintained upon the outer surface of such material by means of the beading or crimping formed in the metal strip forming the retainer, or in any other suitable manner. It will be further noted that the flexible, pliable, cushion material may be plain, or it may be provided with suitable reinforcement, and such flexible, pliable, cushion material may be disposed either flat or it may be folded over longitudinally upon itself in a looped formation, such loop extending the length of the finished article.

One of the objects of this invention is to provide a weather-strip that is dependable in performing its functions, and has its component parts arranged to provide effective protection to the cushion material against vermin, atmospheric conditions and foreign matter. By thus protecting the cushion material the life of the weather-strip is increased. Further objects of my invention reside in providing a weather-strip that may be readily assembled by practically a single operation; that is novel in construction; that is easy to attach; and, which is cheap to manufacture so that it may be sold at a reasonable price to the consumer. Further objects and advantages of course will be apparent to persons who are skilled in the art after the construction and operation of my weather-strip is understood from the following specific description.

I prefer to accomplish the various objects of my invention and to practice the same in the manner hereinafter fully described and as more particularly pointed out in the claims. Reference is now made to the accompanying drawings that form a part of this specification, in which, Figures 1, 2 and 3 are end views showing structures in which a felt cushion material is folded upon itself in looped formation with the free edges clamped in a metal casing, the views showing respectively the felt cushion without reinforcement, with reinforcement at one surface, and with reinforcement in the body of the felt.

Figure 4 shows a strip of felt cushion clamped in a metal strip of U-shaped section.

Figure 5 is similar to Figure 1, showing the use of sponge rubber in lieu of felt.

Figures 14 to 18, taken as a group, show cushion material surrounded upon two faces and one edge with the protective covering and uncovered along one edge; in Figures 14, 15 and 16, the cushion material is felt, with and without reinforcements; and in Figures 17 and 18 the cushion is sponge rubber respectively with and without reinforcement.

Figure 11:
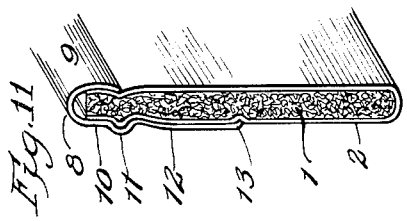
Figure 11 is similar to Figures 9 and 10 showing the reinforcement omitted.
Figure 10:
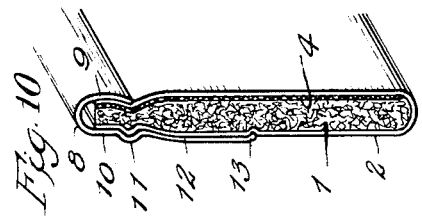
Figures 9 and 10 are end views of a strip of felt cushion arranged flat (unlooped) with reinforcement respectively within the interior of the felt and at surface.
Figure 9:
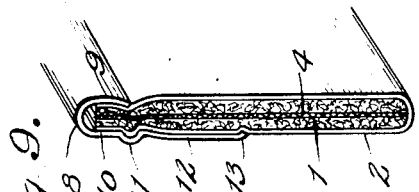

Figures 19, 20 and 21 correspond with Figures 9, 10 and 11, except that the covering material is stitched to the felt cushion.

Figure 22 is similar to Figure 11 and showing the covering material stitched to the felt cushion.

Figure 13:
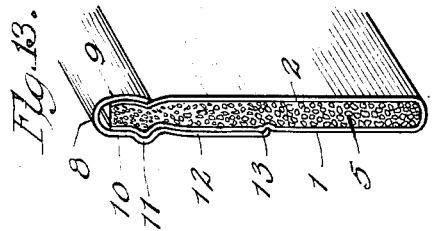
Figures 12 and 13 show sponge rubber substituted for the felt cushion, and respectively reinforced and without reinforcement.

Figure 23 is similar to Figure 13, showing the covering material stitched to the sponge rubber cushion.

Figure 12:
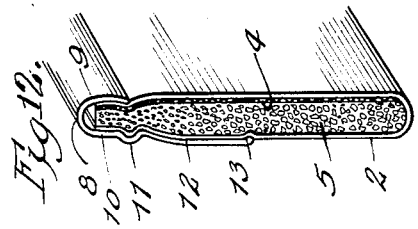

Figure 24 is similar to Figure 12, except that the covering material is stitched to the sponge rubber cushion.

The drawings show divers modifications or forms in which my invention may be produced, and, so far as possible, a single reference character has been used to designate the same part wherever such part appears in the different views.

The article which I have devised consists generally of a flexible, pliable, cushion which is preferably a ribbon or ply of felt 1 that is protected by a sheet 2 of suitable water-proofed fabric. The longitudinal edges of the fabric may extend to one of the edges of the felt and the parts are maintained in position preferably by a row of stitches, staples, or the like, designated as 3, or in any other suitable manner. The strip may be slightly stiffened by employing a strip of reinforcement 4 that is disposed along one of the longitudinal faces of the felt cushion between the latter and the covering or protecting fabric or between two plies of the cushion material. The reinforcement may be any suitable material that will tend to add a degree of stiffness that may be desired in a device of this character. A material that is effective for this purpose is woven fabric such as burlap, canvas or the like that may be treated with sizing or adhesive. The reinforcement of the sponge rubber may be omitted, for example, as shown in Fig. 17.

The protecting material does not extend entirely around the flexible pliable material and is preferably omitted along one of the longitudinal edges. In Figures 14 to 18 the covering material 2 extends across the wide faces of the cushion and around one edge, but is omitted around the opposite edge indicated by the numeral 6. The stitches or other securing means 3 pass through the protective covering material as well as the cushion in a line adjacent the exposed edge 6, and the cushion may be without reinforcement as shown in Figure 14, or may be provided with the reinforcement 4 as shown in Figures 15 and 16. Also the cushion material may be either felt, as shown in Figures 14, 15 and 16 or it may be sponge rubber 5 as shown in Figures 17 and 18 and in the latter event the sponge rubber may be provided with the reinforcement 4 as shown in Figure 18. The several structures shown in Figures 14 to 18 are adapted to be inserted edgewise into a groove or a channel piece 7 (Fig. 14) which may be either wood or metal and may be either a separate piece or may be a part of the doorway, window or ventilator, to which the weather strip is applied. When thus inserted, the uncovered edge 6 will be innermost in the groove or channel and thus will be protected from foreign matter, vermin and the like.

In Figures 1, 2, 3, 5 to 8 inclusive I have shown a cushion of a flexible, pliable material, that is folded longitudinally upon itself or looped and then clamped in a piece of metal that is beaded or otherwise shaped to firmly hold the edges of the material forming the looped cushion. In Figure 1 the strip of felt cushion 1 is wider than that shown in Figures 14 to 18, and it is provided with a longitudinal fold as at 1ª after which the protective cover cloth 2 is placed around the looped portion thereof.

The free longitudinal edges of the cushion and covering fabric are disposed parallel to each other and they are held in compressed relation by means of a metal strip that is so shaped in cross-section that it will bind or clamp the parts together. The metal strip is formed with a channel or seat 8, one of the arms 9 of which is curved inwardly towards the other arm 10, the latter being wider than the arm 9. At a location about opposite the lower edge of arm 9, the arm 10 is provided with an outwardly extending bead or rib 11 and said arm thereafter extends downwardly in a substantially flat portion 12, which is slightly bowed inwardly at its lower edge as at 13. The lower edge of arm 9 is disposed opposite the shallow recess formed on the inside of the bead 11 and when the two arms are pressed towards each other with the cushion and cover fabric between them the latter will be compressed in the manner shown and will be firmly held in position. The metal strip is preferably utilized in nailing the weather-strip upon the door or window in the usual manner.

In Figure 2 the felt cushion is provided with reinforcement or stiffening material 4 upon one surface, preferably the surface that is folded against itself in forming the loop, so that the stiffening material is also formed into a loop in the same manner as the felt cushion. In Figure 3 the reinforcement 4 is disposed within the body of the felt cushion material between the respective faces thereof.

As has been hereinbefore stated, the cushion material, instead of being of felt may be a sponge rubber. Such substitution is shown in Fig. 5 wherein the sponge rubber 5 forming a cushion is looped in the same manner as the felt is looped in Figure 1, and the sponge rubber loop is provided with the covering, the whole structure then being pinched together between and by means of the arms of a metal strip as previously described. In this type, as well as in the other types, the cover fabric may be loose, or it may be secured to the cushion in any suitable manner.

The metal strip need not be the type shown in the figures just described, but it may be a simple U-shaped channel strip 14 as disclosed in Figure 4 wherein the parallel arms of the strip have inwardly curved lower portions 15 that extend towards each other and pinch the felt cushion and fabric cover into intimate relation to secure the parts together. The felt cushion may be provided with reinforcement, either fabric or rubber, in the form of a sheet 4ª as shown in Fig. 4, and sponge rubber may be substituted for the felt shown in this modification.

Figure 6:
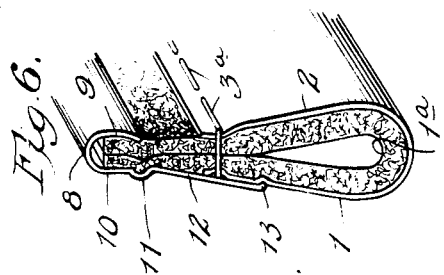

In the structures last described, the metal strip is depended upon to hold or retain the covering in intimate contact with the cushion material, a simple example of which has been described in connection with Figure 1. The types disclosed in Figures 1 to 5 may be modified by uniting the fabric covering to the cushion material (either felt or sponge rubber), by the use of stitches or other securing means such as staples or the like. These securing means (stitches or staples) may be passed through the fabric covering and the cushion at a location back of the lower reach 12 of arm 10 of the metal strip as shown at 3ª in Figure 6. The application of securing means of this type will effect a saving in the covering fabric because it will be of less width so that the longitudinal edges of the latter will terminate adjacent the securing means as shown in Figure 6 and need not extend up inside the channel 8 of the metal strip as previously described.

Figure 8:
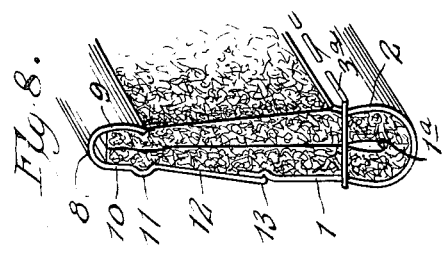
Figures 6, 7 and 8 are similar to Figure 1, showing the protective covering material stitched to a felt cushion, the stitches shown respectively at three locations.
Figure 7:
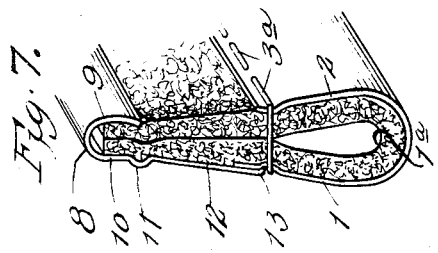

In Figure 7 the securing means 3ª (stitches or staples) are disposed outside the metal strip below the lower edge 13 thereof and the edge of the covering material nearest the edge 13 extends up inside or back of the latter so that it will protect the front face of the cushion from foreign matter. The securing means 3ª in Figure 8 are disposed near the lower edge of the weather-strip close to the loop 1ª of the cushion material and the edge of the covering fabric which is outermost when the weather-strip is mounted, extends up under the lower edge 13 of the metal strip so that the face of the cushion is protected against atmospheric conditions and foreign matter.

In Figures 9 to 13 and Figures 19 to 24 the cushion material, either felt or rubber, is in the form of a flat unlooped strip either with or without reinforcement. For example, in Figure 9 the felt cushion I has the reinforcements 4 disposed within its body between the flat surfaces thereof and in Figure 10 the reinforcement 4 is disposed upon one face of the felt cushion, while in Figure 11 the reinforcement is omitted from the felt cushion 1. In Figures 12 and 13 the rubber cushion is shown respectively with the reinforcement on one face and with the reinforcement omitted. In all of these figures from Figure 9 to 13 the single ply of cushion material either with or without reinforcement is protected by the covering fabric 2 that extends along the opposite faces and around the lower edge of the cushion, and the upper edges of the cloth and the cushion are clamped together between the arms of the metal strip in a manner similar to the structure shown in Figures 1 to 5 inclusive.

In lieu of utilizing the beading 11 of the metal strip and the inwardly turned edge 9 of the other arm of the metal strip to retain the fabric covering upon the cushion, the covering may be attached to the cushion by the securing means 3ª such as stitches or staples. These modifications are shown in Figures 19 to 24 with the exception of Fig. 22.

In Figures 19 and 20 the structures correspond with the structures shown in Figures 9 and 10 in that the reinforcement 4 is respectively within the body of the felt cushion and at one face thereof, and Figure 21 corresponds with Figure 11 in that the reinforcement is omitted. Figures 23 and 24 correspond with the structures shown in Figures 13 and 12 in that the rubber cushion is respectively without reinforcement and is provided with reinforcement on one face. The fabric covering in Figures 19, 20, 21, 23 and 24 is not as extensive as that shown in the corresponding other figures and it is connected by the securing means to the cushion so that the edges of the fabric terminate slightly above the lower edge of the metal strip.

In the structures disclosed herein which employ securing means 3ª such as stitches or staples to connect the covering fabric to the cushion, the back face of the cushion apparently is exposed between the lower edge of the short arm 9 of the metal strip and the upper edge of the covering fabric. This, however, is not detrimental because of the fact that this is as above mentioned, the back or surface of the weather strip and it will lie against and fit snugly to the door or window to which it is attached so that the cushion material is not exposed to atmospheric conditions or foreign matter when the weather-strip has been mounted and is in use. Should it be desired, the covering fabric may extend above the securing means 3ª so that it may be clamped near its edges to the cushion by the metal casing in addition to being stitched or stapled. This is shown in Fig. 22.

What I claim is:

1. A weather-strip comprising a flat strip of flexible pliable material which provides a cushion, a fabric strip providing a cover for the operating lateral edge and the flat face of the cushion which is outermost when the weather-strip is in use, said fabric strip also extending across a portion of the width of the other face of the cushion, and means engaged with opposite faces of the weather-strip for anchoring the longitudinal edge portions of the fabric strip to maintain the cover against displacement.

2. A weather-strip comprising a flat strip of flexible pliable material which provides a cushion, a fabric strip providing a cover for the operating lateral edge and the flat face of the cushion which is outermost when the weather-strip is in use, said fabric strip also extending across a portion of the width of the other face of the cushion, whereby the remaining portion of such face is exposed, and means engaged with opposite faces of the weather-strip for anchoring the longitudinal edge portions of the fabric strip to maintain the cover against displacement.

3. A weather-strip comprising a strip of flexible pliable material having a continuous fold which positions the edges of the strip alongside each other to provide a cushion of looped shape in cross-section, a fabric strip providing a cover for the operating edge and the face of the cushion which is outermost when the weather-strip is in use, said fabric strip also extending across a portion of the width of the other face of the cushion, and means engaged with opposite faces of the weather strip for anchoring the longitudinal edge portions of fabric strip and the adjacent edges of the looped cushion material whereby the cover is maintained against displacement.

4. A weather-strip comprising a strip of flexible pliable material having a continuous fold which positions the edges of the strip alongside each other to provide a cushion of looped shape in cross-section, a fabric strip providing a cover for the operating edge and the face of the cushion which is outermost when the weather-strip is in use, said fabric strip also extending across a portion of the width of the other face of the cushion, and common means engaging the longitudinal edges of the fabric strip and the cushion strip whereby the cushion strip is held in looped cross-section and the cover is maintained against displacement.

5. A weather-strip comprising a flat strip of sponge rubber, and a weatherproof fabric strip disposed upon both side faces and the lateral edge of the rubber strip which is engaged by the element opposing the member on which the weather-strip is mounted, and means engaged with the longitudinal edges of the fabric strip for maintaining the fabric in position.

6. A weather-strip comprising a flat strip of sponge rubber, a weatherproof fabric strip disposed upon both side faces and the lateral edge of the rubber strip which is engaged by the element opposing the member on which the weather-strip is mounted, and means adjacent the other edge of the weather-strip that anchors the fabric strip in position with relation to the rubber strip, and means engaged with the longitudinal edges of the fabric strip for maintaining the fabric in position.

7. A weather-strip comprising a flat strip of sponge rubber, a weatherproof fabric strip disposed upon both side faces and the lateral edge of the rubber strip which is engaged by the element opposing the member on which the weather-strip is mounted, and a yieldable casing embracing the edge of the weather-strip opposite its operating edge and anchors the fabric strip against displacement, and means engaged with the longitudinal edges of the fabric strip for maintaining the fabric in position.

8. A weather-strip comprising a flat strip of sponge rubber, and a waterproof fabric cover separate from and ununited to the rubber strip which cover embraces both faces and the lateral edge of the rubber strip which is engaged by the element opposing the member on which the weather-strip is mounted, and means engaged with the longitudinal edges of the fabric strip for maintaining the fabric in position.

9. A weather-strip comprising a flat strip of flexible pliable material which has greater width than thickness and provides a cushion, a fabric cover enveloping the operating edge and both faces of the cushion and unattached thereto, a strip of reinforcement within said cover and engaging the cushion, and means for anchoring the edges of the fabric cover to maintain it against displacement.

10. A weather-strip comprising a strip of flexible pliable material having a continuous fold which positions the edges side-by-side and provides a cushion of loop-shape in cross-section, a fabric strip covering the folded edge and sides of the cushion and ununited thereto, and means for anchoring the longitudinal edge portions of the fabric strip and the adjacent edges of the looped cushion material against displacement.

11. A weather-strip comprising a strip of flexible pliable material having a continuous fold which positions the edges side-by-side and provides a cushion of loop-shape in cross-section, a weather-proof fabric strip disposed upon both side faces and the edge of the cushion which is engaged by the element opposing the member on which the weather-strip is mounted, said fabric being unsecured to the cushion, and means for anchoring the edges of the cushion strip and fabric strip against displacement.

12. A weather-strip comprising a flat strip of flexible pliable material which provides a cushion, a fabric cover enveloping the operating lateral edge and both flat faces of the cushion and unattached thereto, and means engaged with opposite faces of the weather-strip for anchoring the edges of the fabric cover to maintain it against displacement.

13. A weather-strip comprising a flat strip of soft pliable material, a fabric cover disposed upon the lateral work edge and entirely upon the two side faces of said flat strip and the free edges of the fabric being disposed at or adjacent the uncovered edge of the flat strip, and means engaging the free portions of the fabric to maintain the latter against displacement.

14. A weather-strip comprising a strip of flexible pliable material having a continuous fold which positions the edges side-by-side and provides a cushion of looped shape in cross-section, a fabric strip covering the folded edge and sides of the cushion, and means engaged with opposite faces of the weather-strip for anchoring the edges of the looped cushion material against displacement.

15. A weather-strip comprising a strip of flexible pliable material having a continuous fold which positions the edges side-by-side and provides a cushion of looped shape in cross-section, a fabric strip covering the folded edge and sides of the cushion with its free edges adjacent the free edges of the cushion material, and means for anchoring the free edges of the cover fabric and cushion material against displacement.

16. A weather-strip comprising a strip of flexible pliable material having a continuous fold which positions the edges side-by-side and provides a cushion of looped shape in cross-section, a fabric strip covering the folded edge and sides of the cushion, and means encompassing the edge of the weather-strip opposite the fold and engaged with the side faces thereof for anchoring the structure against displacement.

17. A weather-strip comprising a strip of flexible pliable material having a continuous longitudinally extending fold which provides a cushion of loop-shape in cross-section, a fabric cover enveloping at least the portion of the cushion that is exposed in use, a strip of reinforcement coacting with the cushion, and means for maintaining the elements of the weather-strip in assembly.

18. A weather-strip comprising a flat strip of flexible pliable material which provides a cushion, a fabric cover enveloping the lateral work edge and both flat faces of the cushion, a strip of yieldable material providing reinforcement for said cushion, and means for maintaining the elements of the weather-strip in assembly.

19. A weather-strip comprising a strip of flexible pliable material having a continuous fold which positions the edges approximately side-by-side and provides a cushion of looped shape in cross-section, a fabric cover for the folded edge of the cushion, and means for anchoring the edges of the looped cushion material against displacement.

20. A weather-strip comprising a strip of flexible pliable material having a continuous fold which positions the edges approximately side-by-side and provides a cushion of looped shape in cross-section, a fabric strip covering the folded edge and sides of the cushion, and means extending over the edges of the cushion opposite the fold for anchoring the cushion material against displacement.

21. A weather-strip comprising a flat strip of soft pliable material, a fabric cover disposed upon at least both side faces and the lateral edge of the strip of material which is engaged by the element opposing the member on which the weather strip is mounted, and a yieldable casing embracing the edge of the weatherstrip opposite its operating edge and anchors the fabric cover against displacement.

REGINALD B. CALCUTT.